United States Patent
Wu et al.

(10) Patent No.: US 12,032,477 B2
(45) Date of Patent: Jul. 9, 2024

(54) METHOD AND APPARATUS FOR GENERATING AND APPLYING DEEP LEARNING MODEL BASED ON DEEP LEARNING FRAMEWORK

(71) Applicant: Beijing Baidu Netcom Science Technology Co., Ltd., Beijing (CN)

(72) Inventors: Tian Wu, Beijing (CN); Yanjun Ma, Beijing (CN); Dianhai Yu, Beijing (CN); Yehua Yang, Beijing (CN); Yuning Du, Beijing (CN)

(73) Assignee: Beijing Baidu Netcom Science Technology Co., Ltd., Beijing (CN)

( * ) Notice: Subject to any disclaimer, the term of this patent is extended or adjusted under 35 U.S.C. 154(b) by 41 days.

(21) Appl. No.: 17/856,091

(22) Filed: Jul. 1, 2022

(65) Prior Publication Data
US 2023/0185702 A1 Jun. 15, 2023

(30) Foreign Application Priority Data
Dec. 10, 2021 (CN) .......................... 202111508796.8

(51) Int. Cl.
*G06N 3/08* (2023.01)
*G06F 9/445* (2018.01)
(Continued)

(52) U.S. Cl.
CPC .......... *G06F 11/3688* (2013.01); *G06N 3/08* (2013.01)

(58) Field of Classification Search
CPC ...... G06F 11/3688; G06N 3/08; G06N 3/045; G06N 3/084; G06N 3/04; H04N 19/176;
(Continued)

(56) References Cited

U.S. PATENT DOCUMENTS 11,507,774 B2 * 11/2022 Tsai ........................ G06N 3/045
2018/0137093 A1 5/2018 Goldfarb et al.
(Continued)

FOREIGN PATENT DOCUMENTS

| CN | 109408351 A | 3/2019 |
| CN | 111144561 A | 5/2020 |

(Continued)

OTHER PUBLICATIONS

Chadrasekaran et al., A Combinatorial Approach to Testing Deep Neural Network-based Autonomous Driving Systems, 10 pages (Year: 2021).*

(Continued)

*Primary Examiner* — Thuy Dao
(74) *Attorney, Agent, or Firm* — Moore & Van Allen PLLC

(57) ABSTRACT

A method and apparatus is provided for generating and applying a deep learning model based on a deep learning framework, and relates to the field of computers. A specific implementation solution includes that a basic operating environment is established on a target device, where the basic operating environment is used for providing environment preparation for an overall generation process of a deep learning model; a basic function of the deep learning model is generated in the basic operating environment according to at least one of a service requirement and a hardware requirement, to obtain a first processing result; an extended function of the deep learning model is generated in the basic operating environment based on the first processing result, to obtain a second processing result; and a preset test script is used to perform function test on the second processing result, to output a test result.

20 Claims, 3 Drawing Sheets

(51) Int. Cl.
  *G06F 9/455* (2018.01)
  *G06F 11/36* (2006.01)
  *G06N 3/04* (2023.01)
  *G06N 20/00* (2019.01)

(58) Field of Classification Search
  CPC .... H04N 19/147; H04N 19/82; H04N 19/117; H04N 19/159; H04N 19/149; G06T 9/002
  See application file for complete search history.

(56) References Cited

U.S. PATENT DOCUMENTS

| | | |
|---|---|---|
| 2020/0210832 A1 | 7/2020 | Driscoll |
| 2021/0064518 A1* | 3/2021 | Abu Taha ........... G06F 11/3688 |
| 2021/0081837 A1 | 3/2021 | Polleri et al. |

FOREIGN PATENT DOCUMENTS

| | | |
|---|---|---|
| CN | 111258913 A | 6/2020 |
| CN | 112313674 A | 2/2021 |
| CN | 112734040 A | 4/2021 |
| CN | 113052328 A | 6/2021 |
| WO | 2021050391 A1 | 3/2021 |

OTHER PUBLICATIONS

First Search Report issued by the Chinese Patent Office for Chinese Patent Application No. 2021115087968.

Office Action issued by the Japanese Patent Office for Japanese Patent Application No. 2022-178862, dated Oct. 27, 2023.

Extended Search Report issued by the European Patent Office for European Patent Application No. 22180958.5, dated Dec. 23, 2022.

* cited by examiner

METHOD AND APPARATUS FOR GENERATING AND APPLYING DEEP LEARNING MODEL BASED ON DEEP LEARNING FRAMEWORK

CROSS-REFERENCE TO RELATED APPLICATIONS

The present disclosure claims priority of Chinese Patent Application No. 202111508796.8, filed to China Patent Office on Dec. 10, 2021. Contents of the present disclosure are hereby incorporated by reference in entirety of the Chinese Patent Application.

TECHNICAL FIELD

The present disclosure relates to the technical field of computers, and in particular to a method and apparatus for generating and applying a deep learning model based on a deep learning framework.

BACKGROUND OF THE INVENTION

With the development of an artificial intelligence technology, more and more enterprises use a deep learning framework to develop a deep learning model to solve problems in respective service scenarios. A typical flow includes the following steps. A service requirement side proposes requirements according to a service scenario. An algorithm engineer selects an appropriate basic algorithm, prepares appropriate data, uses a deep learning framework to train a deep learning model meeting requirements through a series of actions such as data processing, algorithm optimization, parameter optimization, and model training, and deploy the deep learning model into an actual service production environment. Finally, a service is launched.

However, when the above solution is used to solve problems, the process of manual processing is too tedious, and the algorithm obtained after manual processing may have the problem that a service environment is not suitable.

In view of the above problems, no effective solution has been proposed yet.

SUMMARY OF THE INVENTION

At least some embodiments of the present disclosure provide a method and apparatus for generating and applying a deep learning model based on a deep learning framework.

An embodiment of the present disclosure provides a method for generating and applying a deep learning model based on a deep learning framework, including: establishing a basic operating environment on a target device, where the basic operating environment is used for providing environment preparation for an overall generation process of a deep learning model; generating a basic function of the deep learning model in the basic operating environment according to at least one of a service requirement and a hardware requirement, to obtain a first processing result; generating an extended function of the deep learning model in the basic operating environment based on the first processing result, to obtain a second processing result; and using a preset test script to perform function test on the second processing result, to output a test result.

Another embodiment of the present disclosure provides an apparatus for generating and applying a deep learning model based on a deep learning framework, including: an establishment module, configured to establish a basic operating environment on a target device, where the basic operating environment is used for providing environment preparation for an overall generation process of a deep learning model; a first generation module, configured to generate a basic function of the deep learning model in the basic operating environment according to at least one of a service requirement and a hardware requirement, to obtain a first processing result; a second generation module, configured to generate an extended function of the deep learning model in the basic operating environment based on the first processing result, to obtain a second processing result; and a test module, configured to use a preset test script to perform function test on the second processing result, to output a test result.

Another embodiment of the present disclosure provides an electronic device. The electronic device includes at least one processor and a memory communicatively connected with the at least one processor. The memory is configured to store at least one instruction executable by the at least one processor. The at least one instruction is performed by the at least one processor, to cause the at least one processor to perform the method mentioned above.

Another embodiment of the present disclosure provides a non-transitory computer-readable storage medium storing at least one computer instruction. The at least one computer instruction is used for a computer to perform the method mentioned above.

Another embodiment of the present disclosure provides a computer program product. The method mentioned above is implemented when the computer program is performed by a processor.

It should be understood that, the content described in this section is not intended to identify the key or important features of the embodiments of the present disclosure, nor is it intended to limit the scope of the present disclosure. Other features of the present disclosure will become easy to understand through the following description.

BRIEF DESCRIPTION OF THE SEVERAL VIEWS OF THE DRAWINGS

Drawings are used for better understanding the solution, and are not intended to limit the present disclosure.

DETAILED DESCRIPTION OF THE INVENTION

Exemplary embodiments of the present disclosure are described in detail below with reference to the drawings, including various details of the embodiments of the present disclosure to facilitate understanding, and should be regarded as exemplary. Thus, those of ordinary skilled in the art shall understand that, variations and modifications can be made on the embodiments described herein, without departing from the scope and spirit of the present disclosure. Likewise, for clarity and conciseness, descriptions of well-known functions and structures are omitted in the following description.

Figure 1:
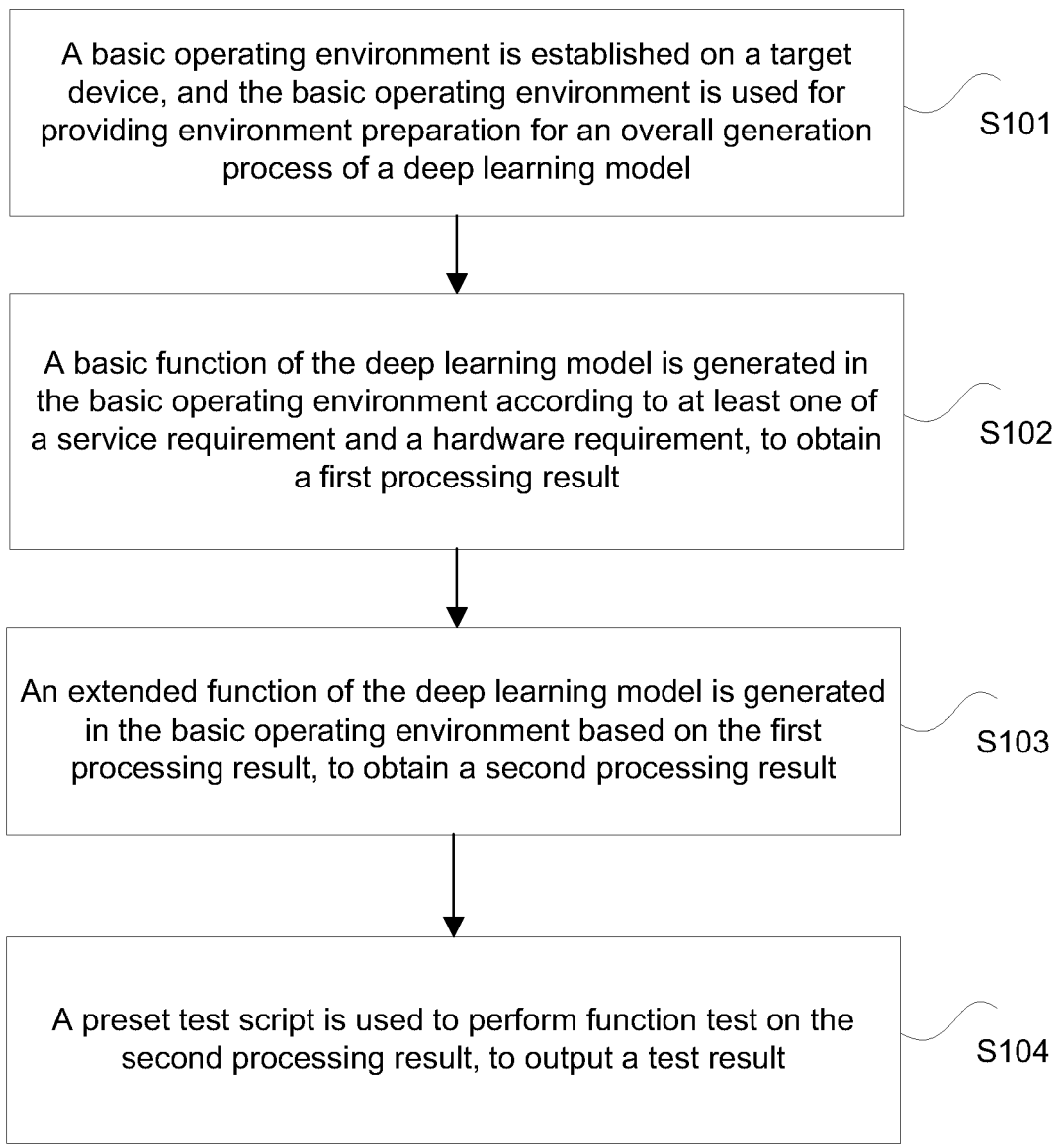
FIG. 1 is a flowchart of a method for generating and applying a deep learning model based on a deep learning framework according to an embodiment of the present disclosure.

An embodiment of the present disclosure provides a method for generating and applying a deep learning model based on a deep learning framework shown in FIG. 1. FIG. 1 is a flowchart of a method for generating a deep learning model according to an embodiment of the present disclosure. As shown in FIG. 1, the method includes the following steps.

At step S101, a basic operating environment is established on a target device, and the basic operating environment is used for providing environment preparation for an overall generation process of a deep learning model.

At step S102, a basic function of the deep learning model is generated in the basic operating environment according to at least one of a service requirement and a hardware requirement, to obtain a first processing result.

At step S103, an extended function of the deep learning model is generated in the basic operating environment based on the first processing result, to obtain a second processing result.

At step S104, a preset test script is used to perform function test on the second processing result, to output a test result.

Through the above steps, the basic operating environment that can establish an overall production process of the deep learning model is established on the target device. The basic function of the deep learning model is generated in the basic operating environment according to at least one of the service requirement and the hardware requirement, to obtain the first processing result. The extended function of the deep learning model is generated in the basic operating environment based on the first processing result, to obtain the second processing result. Then, the preset test script is used to perform function test on the second processing result, to output the test result. Since the basic function that generates deep learning in an operating environment is obtained according to at least one of the service requirement and the hardware requirement, the basic function can meet requirements of actual scenarios and services. The extended function of the deep learning model is generated in the basic operating environment based on the first processing result, so that targeted setting of the extended function can be performed according to the first processing result. Finally, through testing the second processing result, functions of a model can be effectively verified. Therefore, the technical problem that an overall flow of model designing cannot be set when environments and functions of the model is established in the related art is solved. Through using the preset test script to perform function test on the second processing result, the test result is outputted to guarantee the reliability of the overall process of the model designing.

As an optional embodiment, the basic operating environment is established on the target device. The target device is a device that can establish the operating device and perform the construction, training and verification of the model, for example, a host, which is not limited herein. The basic operating environment is an operating environment that provides environment preparation for an overall generation process of the deep learning model, that is, basic environment preparation is required before development. According to different actual services and requirements, hardware conditions of the target device are different, and the basic operating environment established through development is further different. Therefore, when the basic operating environment is established on the target device, hardware configuration information of the target vehicle may be first acquired, and then software configuration information of the target vehicle is determined based on the hardware configuration information. Through the hardware configuration information, various software information of the target device can be determined. For example, operating system information, deep learning framework information, model base information, a pre-training model, and training data and prediction data corresponding to the pre-training model of the target device can be determined. The basic operating environment is established according to the hardware configuration information and the software configuration information. The basic operating environment established according to the hardware configuration information and the software configuration information is guaranteed to be suitable for the target device, so that orderly operation of follow-up development can be ensured. Therefore, problems in the related art that suitable operation environments are difficult to accurately configured from huge amount of information due to excessive hardware types of an actual service environment and excessive software versions can be solved.

As an optional embodiment, the basic function of the deep learning model is generated in the basic operating environment according to at least one of the service requirement and the hardware requirement, to obtain the first processing result. Through determining the basic function according to at least one of the service requirement and the hardware requirement, the basic function can be guaranteed to meet a current service requirement, so that the model can be smoothly and orderly operated.

As an optional embodiment, the overall generation process of the deep learning model includes multiple processing links. For example, the overall generation process includes a model algorithm selection link, a model training software and hardware environment configuration link, a model training mode selection link, a model compression mode selection link, a model training link, a model saving link, a model prediction deployment mode selection link, and a model deducing deployment software and hardware environment configuration link. Corresponding settings are required to be performed on the multiple processing links, to generate the deep learning model. The multiple processing links may be configured to develop, train, and deduce the deep learning model, so that the whole process of model development, training, deducing, and verification can be realized. Therefore, when the basic function of the deep learning model is generated in the basic operating environment to obtain the first processing result, the multiple processing links contained in the overall generation process of the deep learning model may be first determined. According to at least one of the service requirement and the hardware requirement, the basic function is designed for different processing links, and then the basic function of each of the multiple processing links is generated in the basic operating environment, to obtain the first processing result. Therefore, problems of difficulty in algorithm selection and inability to obtain full process support in the related art are solved.

As an optional embodiment, an operation of generating the basic function of each of the multiple processing links in the basic operating environment according to at least one of the service requirement and the hardware requirement, to obtain the first processing result includes the following steps. A basic function of a first part processing link of the multiple processing links is generated in the basic operating environment according to the service requirement, to obtain a third processing result. A basic function of a second part processing link of the multiple processing links is generated in the basic operating environment according to the hardware requirement, to obtain a fourth processing result. A basic function of a third part processing link of the multiple processing links is generated in the basic operating environment according to the service requirement and the hardware requirement, to obtain a fifth processing result. That is, the basic functions are respectively set according to the service requirement, the hardware requirement, or the service requirement and the hardware requirement, to obtain the processing results, respectively. Then, according to the processing results (namely the third processing result, the fourth processing result, and the fifth processing result), the basic functions of each of the multiple processing links are generated to obtain the first processing result. Through the corresponding settings of the service requirement, the hardware requirement, or the service requirement and the hardware requirement, the first processing result can be more suitable for actual scenarios and requirements. A process of respectively performing the setting of the basic functions according to the service requirement, the hardware requirement, or the service requirement and the hardware requirement to respectively obtain the processing results is described in detail below.

The basic function of the first part processing link is generated in the basic operating environment according to the service requirement, to obtain the third processing result. The basic function of the first part processing link generated in the basic operating environment according to the service requirement may include a model algorithm, a model compression mode, a prediction deployment mode, and the like. That is, the above process is to select the model algorithm to be used in the basic operating environment from a model base according to the service requirement, select the model compression mode to be used in the basic operating environment according to the service requirement, and select the prediction deployment mode to be used in the basic operating environment according to the service requirement. Through selecting the model algorithm according to the service requirement, the problem that there are many papers on deep learning open source algorithms in the related art and it is very difficult to find and select appropriate and reliable algorithms can be solved. In the model compression mode selected according to the service requirement, the model compression mode may adopt a Slim technology for Slim technology selection, to compress the model volume of a large training model, so as to achieve an effect of accelerating prediction speed. After the prediction deployment mode is selected according to the service requirement, during actual deployment, the model may be first saved in a standardized format, for example, a basic Inference mode, so that conversion is performed according to the standardized format to achieve deployment. Therefore, the problem that the deployment cannot be smoothly achieved in a case that prediction deployment involves various deployment modes in the related art can be solved.

The basic function of the second part processing link of the multiple processing links is generated in the basic operating environment according to the hardware requirement, to obtain the fourth processing result. The basic function of the second part processing link generated in the basic operating environment according to the hardware requirement may include a software and hardware environment. The software and hardware environment is further classified into software and hardware environments under different situations, for example, a software and hardware environment used by model training, or a software and hardware environment used by model deducing deployment. Therefore, the software and hardware environments under different situations are required to be configured. That is, the above process is to configure a first software and hardware environment and a second software and hardware environment to be used in the basic operating environment according to the hardware requirement. The first software and hardware environment is a software and hardware environment to be used by model training, and the second software and hardware environment is a software and hardware environment to be used by model deducing deployment. Through determining the software and hardware environment according to the hardware requirement, the model may be usable in the software and hardware environment. That is, the target device may cause the model to be operated in the software and hardware environment. In addition, since the hardware requirement matches the software and hardware environment, the speed for generating the model can be effectively accelerated on the premise of ensuring the normal operation of the model, thereby enhancing the efficiency of generating the model.

The basic function of the third part processing link of the multiple processing links is generated in the basic operating environment according to the service requirement and the hardware requirement, to obtain the fifth processing result. The basic function of the third part processing link of the multiple processing links generated in the basic operating environment according to the service requirement and the hardware requirement includes a training mode of the model. That is, the model training mode to be used in the basic operating environment is selected according to the service requirement and the hardware requirement. The training mode of the model is determined according to the service requirement and the hardware requirement, so that the problem of insufficient support during the generation of the model in the related art is solved, for example, the problem that a training part involves insufficient support for distributed and mixed precision capabilities.

As an optional embodiment, the extended function of the deep learning model is generated in the basic operating environment based on the first processing result, to obtain the second processing result. Therefore, on the basis of basic function development, key links can be supplemented to achieve more comprehensive and complete function support in the whole process. When the extended function is generated, the following steps may be included. The extended function in addition to the basic function is added into each of the multiple processing links based on the first processing result, and multiple functions to be selected corresponding to each processing link are determined. Any one function is selected from the multiple functions to be selected corresponding to each processing link to combine and perform the overall generation process of the deep learning model, to obtain the second processing result. It is to be noted that, when functions in the multiple processing links are extended, different situations of each link may be determined according to the two adjacent processing links, so that corresponding settings are performed on different situations, to ensure that the extended functions in the processing links are effective. Therefore, the generated model is guaranteed to be effective. Through the steps mentioned above, not only the functions of the model can be extended, but also it is very easy to extend the number of the models. Therefore, multiple models that can achieve actual service requirements are conveniently and rapidly generated.

As an optional embodiment, there are multiple operations of respectively selecting any one function from the multiple functions to be selected corresponding to each processing link to combine and perform the overall generation process of the deep learning model, to obtain the second processing result. For example, a to-be-combined model algorithm is randomly selected in the model algorithm selection link. A first to-be-combined software and hardware environment is randomly determined in the model training software and hardware environment configuration link. A to-be-combined model training mode is randomly selected in the model training mode selection link. A to-be-combined model compression mode is randomly selected in the model compression mode selection link. A to-be-combined model prediction deployment mode is randomly selected in the model prediction deployment mode selection link. A second to-be-combined software and hardware environment is randomly determined in the model deducing deployment software and hardware environment configuration link. Therefore, the to-be-combined model algorithm, the first to-be-combined software and hardware environment, the to-be-combined model training mode, the to-be-combined model compression mode, the to-be-combined model prediction deployment mode, and the second to-be-combined software and hardware environment are combined to perform the overall generation process of model developing, training and deducing to obtain the second processing result, until combinations in the multiple functions to be selected corresponding to each processing link are completely performed. Through extending a large number of the models, possible situations may be verified, so that the models that can achieve the actual service requirements are conveniently and rapidly generated.

As an optional embodiment, the preset test script is used to perform function test on the second processing result, to output the test result. The test result includes: identification information of the deep learning model; software and hardware configuration information associated with the deep learning model; attribute test information of the deep learning model; and prediction result information of the deep learning model. For example, the identification information of the deep learning model may include software version number information used during generation of the model. The software and hardware configuration information may include software and hardware configuration information used by model training, and software and hardware configuration information used by model deducing deployment. The attribute test information may include information such as speed, accuracy, loss values, and time consumption during model training, and the performance of the model. The prediction result information may include prediction results including model names and prediction data. Through outputting the test result related to different embodiment, information of each embodiment can be clearly and legibly learned. Through using the preset test script to perform function test on the second processing result, all embodiments of the model can be evaluated to obtain an accurate and high-reliability test result. The preset test script may be operated with one click, or may be operated automatically. Through using the preset test script operated with one click, the model may be deployed in various complex software and hardware environments. Through using the automatic preset test script, the whole process functions of the model may be rapidly started to support verification, and the test result is outputted, so that feasibility verification in various environments may be further determined according to the result. In addition, test may also be performed by periodically using the preset test script, so that the stable and reliable model is guaranteed through strict access test requirements and periodical test.

As an optional embodiment, at least one test point position is set in the overall generation process of the deep learning model by using the preset test script, and function test is performed on the second processing result based on the at least one test point position, to output the test result. That is, the at least one test point position has a function of performing test to obtain the test result. For example, in a case that the test result includes time consumption information of a attribute test of the deep learning model, the time consumption information may be obtained by setting the at least one test point position. For example, one test point position is established when the model is generated, and one test point position is established when model training is finished. The two test point positions respectively record a current time point. Time consumption of model training may be obtained by obtaining a difference between the two test point positions, so as to obtain the test result of time consumption. Other corresponding settings may also be performed on the at least one test point position according to a specific situation, so that the at least one test point position can perform multiple function tests, so as to obtain multiple corresponding test results. Through setting the at least one test point position, a complete process from training to deployment at various scenarios may be rapidly completed, so that the model can be guaranteed to successfully complete a whole process functions of development, training and deducing.

It is to be noted that, there are various combinations in the multiple functions to be selected corresponding to each of the multiple processing links. The test result outputted when function test performed on the second processing result based on the at least one test point position further includes the following step. A test result that is outputted by respectively performing function test on the combinations in the multiple functions to be selected corresponding to each processing link based on the at least one test point position.

Based on the above embodiments and optional embodiments, an optional implementation is provided, and described in detail below.

In the optional implementation of the present disclosure, a solution for supporting a whole process of model development, training, and deducing based on the deep learning framework is provided, and is configured with a corresponding system. The system includes complete codes, documents, supporting tools, and specifications. In this way, the deep learning framework is guaranteed to support the whole process of the development, training, and deducing of the deep learning model.

Figure 2:
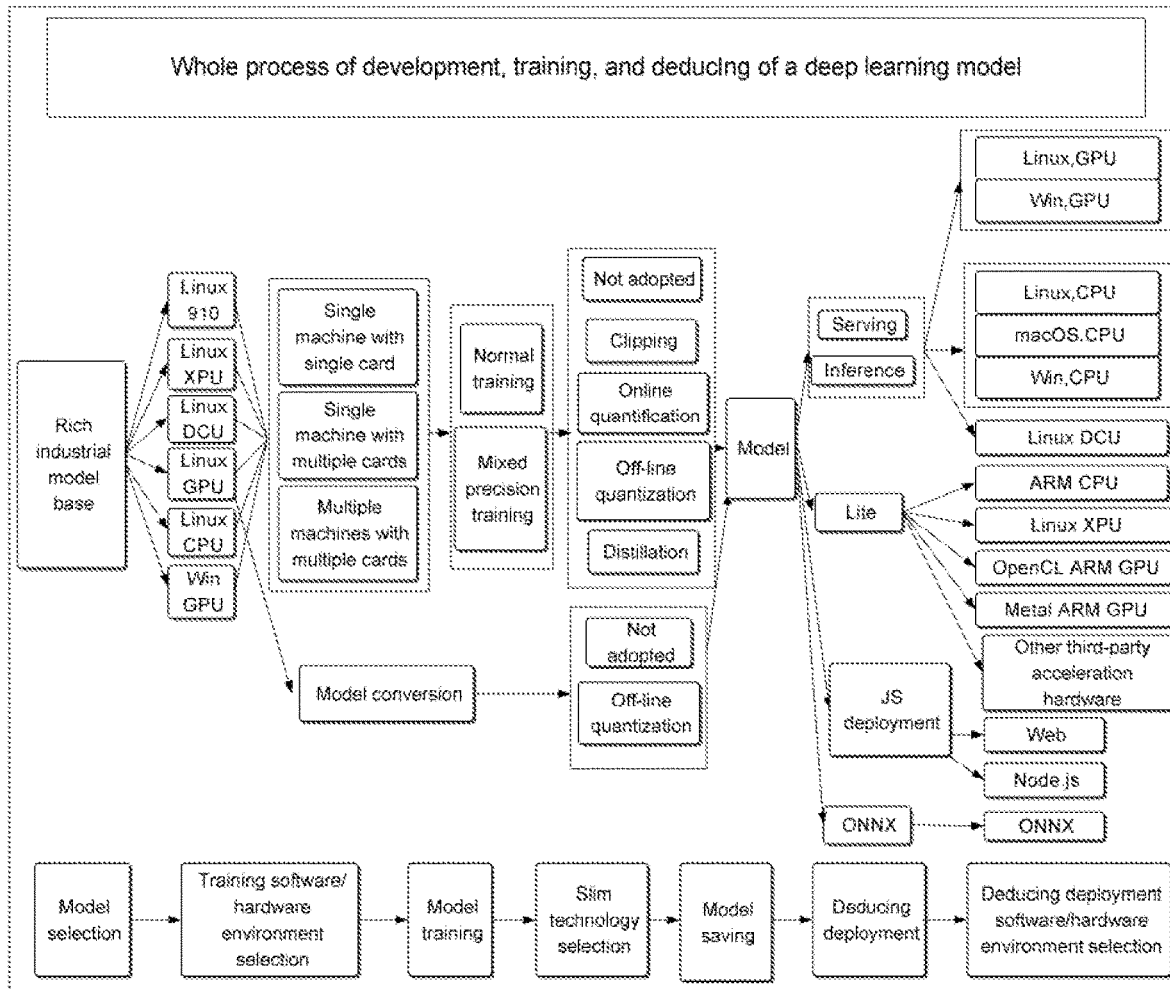
FIG. 2 is an architecture diagram of a system for generating and applying a deep learning model based on a deep learning framework according to an optional implementation of the present disclosure.

FIG. 2 is an architecture diagram of a system for generating and applying a deep learning model based on a deep learning framework according to an optional implementation of the present disclosure. As shown in FIG. 2, this architecture diagram shows steps of model selection from a rich industrial model base, training software and hardware environment selection, model training, Slim technology selection, model saving, and selection of prediction deployment modes and deployment software and hardware environments. Through the above steps, the system shown in FIG. 2 covers the function support of the whole process of the development, training, and deducing of the deep learning model.

The software and hardware environment includes environments such as Graphics Processing Unit (GPU), Central Processing Unit (CPU), Neural Network Processing Unit (NPU), Domain Control Unit (DCU), and Xilinx Processing Unit (XPU) under Linux, windows, and macOS. Model training includes training modes such as distributed training and mixed precision training. The prediction deployment mode includes deployment modes such as Inference, serving, lite, and JavaScript (JS). The deployment software and hardware environment includes environments such as GPU, CPU, NPU, DCU, XPU, Advanced RISC Machines (ARM), and Web under Linux, windows, and macOS. Slim technology selection mainly refers to model compression (including clipping and quantification), the main reason is that a general training model is relatively large, so that the volume of the model needs to be compressed to accelerate prediction speed.

The optional implementation of the present disclosure is described in detail below.

(I) Basic Environment Preparation

It is mainly the preparation of the basic environment before development. A preparation phase includes the preparation of a hardware device, the installation of a basic operating system, the installation of the deep learning framework, the preparation of compiling or compiled third-party libraries, the download and unzipping of a pre-training model, and the download and unzipping of basic training and prediction data.

(II) Basic Function Development

At step S1, individual models are developed for each part.
1) Model selection: an appropriate model algorithm is selected from the industrial model base; and the model algorithm may be selected by a user according to experience, or may be selected, by the user, from algorithms that are recommended in the industrial model base.
2) Selection of a training software and hardware environment: according to an actual situation, that is, a software and hardware condition during actual application, an appropriate software and hardware environment is selected.
3) A model training phase: a model training mode is selected according to the software and hardware environment and an actual service requirement.
4) Model compression technology selection: according to a requirement for a size and speed of the model in the actual service requirement, an appropriate model technology is selected.

At step S2, a model development process is complete, and model training is started to obtain a trained model.

At step S3, the trained model is saved in a basic inference mode.

At step S4, the processing of deployment is performed.
1) Prediction deployment selection: an appropriate prediction deployment mode is selected according to the actual service requirement.
2) Selection of a deducing deployment software and hardware environment: according to the actual situation, that is, a software and hardware condition during actual application, an appropriate software and hardware environment is selected.

(III) Support of Function Development

On the basis of basic function development, key links can be supplemented to smoothly complete the whole process, so as to achieve function support of the whole process.

At step S1, in a standard environment of (I), a model is selected, steps of (II) are connected, and under the premise of one selection in each link, the whole process is completed with a single line.

The standard environment is a set of environments that is determined according to actual situations, which is not changed in subsequent steps.

At step S2, multiple selections of sub-steps are extended, different situations of each link are determined through the two adjacent combinations, to ensure that the multiple selections of each link and functions of the combinations of a next phase can be effectively performed.

At step S3, the effectiveness of the above entire block diagram is guaranteed in the whole process from development, training to deducing.

At step S4, the number of the models is extended, to finally complete the whole process of all of the models.

(IV) Whole Process Report Output

It is mainly to output key process reports of (II) and (III), and the outputted content includes the following.
1) Scripts developed for automated testing.
2) A small number of test points are added at positions required to be indicated and outputted in training and deducing codes according to automation, so that the test points can obtain various information including key printing information.
3) The automated testing scripts are started to output test report results. The content in the test report results includes, but is not limited to, speed, loss, precision, and time consumption related to training, prediction of software version numbers, hardware, and configuration information, model names, dataset information during model training, performance information (for example, consumption of video memory resource information), and information such as time consumption and prediction results.

The following beneficial effects may be achieved through the above optional implementations.
(1) The method and system provided in the optional implementations of the present disclosure may be widely applied to development processes in various open source projects, and provide function support for the whole process from training to deducing.
(2) The method and system provided in the optional implementations of the present disclosure may be widely applied to code maintenance and management process in enterprises, so that risks of online problems for the enterprises can be reduced.
(3) The method and system provided in the optional implementations of the present disclosure may better be applied to industrial practice by using a system preset algorithm. Therefore, an enterprise developer may use model algorithms deposited in this system and the function support of the whole process from development, training and deducing to improve development efficiency by more than 50%.
(4) Through the method and system provided in the optional implementations of the present disclosure, quality management and control can be performed on deep learning development processes of the enterprises. Therefore, compatibility and adaptability problems in the process may be effectively reduced, and the one-time pass rate of test is increased by 20%.
(5) Through the method and system provided in the optional implementations of the present disclosure, the automated testing scripts can be operated with one click, so that the adaptability of the model in a new software and hardware environment may be rapidly verified. The method and system may be applied to the evaluation process of various centralized procurement bidding of the enterprises. Through the automated scripts to verify the compliance rate of the software and hardware environments, a verification cost can be reduced by 30%.

(6) Specifications and tools provided by the method and system provided in the optional implementations of the present disclosure may be gradually promoted as group standards and industrial standards in related fields, thereby enhancing the standardization level of the whole process of development, training, and deducing based on the deep learning framework in the entire related industries.

Figure 3:
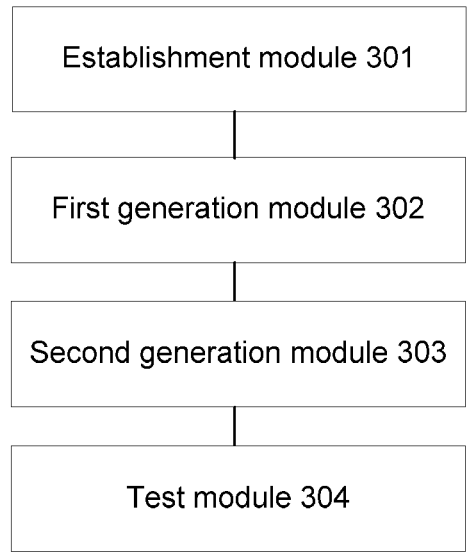
FIG. 3 is a structural block diagram of an apparatus for generating and applying a deep learning model based on a deep learning framework according to an embodiment of the present disclosure.

An embodiment of the present disclosure further provides an apparatus for generating and applying a deep learning model based on a deep learning framework. FIG. 3 is a structural block diagram of an apparatus for generating and applying a deep learning model based on a deep learning framework according to an embodiment of the present disclosure. As shown in FIG. 3, the apparatus includes an establishment module 301, a first generation module 302, a second generation module 303, and a test module 304. The apparatus is described below.

The establishment module 301 is configured to establish a basic operating environment on a target device, and the basic operating environment is used for providing environment preparation for an overall generation process of a deep learning model. The first generation module 302 is connected with the establishment module 301, and is configured to generate a basic function of the deep learning model in the basic operating environment according to at least one of a service requirement and a hardware requirement, to obtain a first processing result. The second generation module 303 is connected with the first generation module 302, and is configured to generate an extended function of the deep learning model in the basic operating environment based on the first processing result, to obtain a second processing result. The test module 304 is connected with the second generation module 303, and is configured to use a preset test script to perform function test on the second processing result, to output a test result.

It is to be noted herein that, the establishment module 301, the first generation module 302, the second generation module 303, and the test module 304 correspond to step S101 to step S104 in the embodiment mentioned above. Examples and application scenarios implemented by the above modules and the corresponding steps are the same, but are not limited to the contents disclosed in the embodiment mentioned above.

Optionally, the establishment module 301 is configured to: acquire hardware configuration information of the target device; determine software configuration information of the target device based on the hardware configuration information; and establish the basic operating environment according to the hardware configuration information and the software configuration information.

Optionally, the establishment module 301 is configured to determine operating system information, deep learning framework information, model base information, a pre-training model, and training data and prediction data corresponding to the pre-training model of the target device based on the hardware configuration information.

Optionally, the first generation module 302 is configured to: determine multiple processing links contained in an overall generation process of the deep learning model, where the multiple processing links are configured to develop, train, and deduce the deep learning model; and generate a basic function of each of the multiple processing links in the basic operating environment according to at least one of the service requirement and the hardware requirement, to obtain the first processing result.

Optionally, the first generation module 302 is configured to: generate a basic function of a first part processing link of the multiple processing links in the basic operating environment according to the service requirement, to obtain a third processing result; generate a basic function of a second part processing link of the multiple processing links in the basic operating environment according to the hardware requirement, to obtain a fourth processing result; generate a basic function of a third part processing link of the multiple processing links in the basic operating environment according to the service requirement and the hardware requirement, to obtain a fifth processing result; and generate the basic function of each of the multiple processing links according to the third processing result, the fourth processing result, and the fifth processing result, to obtain the first processing result.

Optionally, the first generation module 302 is configured to: select a model algorithm to be used in the basic operating environment from a model base according to the service requirement; select a model compression mode to be used in the basic operating environment according to the service requirement; select a prediction deployment mode to be used in the basic operating environment according to the service requirement; and determine the model algorithm, the model compression mode, and the prediction deployment mode as the third processing result.

Optionally, the first generation module 302 is configured to: configure a first software and hardware environment and a second software and hardware environment to be used in the basic operating environment according to the hardware requirement, where the first software and hardware environment is a software and hardware environment to be used by model training, and the second software and hardware environment is a software and hardware environment to be used by model deducing deployment; and determine the first software and hardware environment and the second software and hardware environment as the fourth processing result.

Optionally, the first generation module 302 is configured to: select a model training mode to be used in the basic operating environment according to the service requirement and the hardware requirement; and determine the model training mode as the fifth processing result.

Optionally, the multiple processing links include: a model algorithm selection link; a model training software and hardware environment configuration link; a model training mode selection link; a model compression mode selection link; a model training link; a model saving link; a model prediction deployment mode selection link; and a model deducing deployment software and hardware environment configuration link.

Optionally, the second generation module 303 is configured to: add the extended function in addition to the basic function into each of the multiple processing links based on the first processing result to determine multiple functions to be selected corresponding to each processing link; and respectively select any one function from the multiple functions to be selected corresponding to each processing link to combine and perform the overall generation process of the deep learning model, to obtain the second processing result.

Optionally, the second generation module 303 is configured to: randomly select a to-be-combined model algorithm in the model algorithm selection link; randomly determine a first to-be-combined software and hardware environment in the model training software and hardware environment configuration link; randomly select a to-be-combined model training mode in the model training mode selection link; randomly select a to-be-combined model compression mode in the model compression mode selection link; randomly select a to-be-combined model prediction deployment mode in the model prediction deployment mode selection link; randomly determine a second to-be-combined software and hardware environment in the model deducing deployment software and hardware environment configuration link; and combine the to-be-combined model algorithm, the first to-be-combined software and hardware environment, the to-be-combined model training mode, the to-be-combined model compression mode, the to-be-combined model prediction deployment mode, and the second to-be-combined software and hardware environment to perform the overall generation process of model developing, training and deducing to obtain the second processing result, until combinations in the multiple functions to be selected corresponding to each processing link are completely performed.

Optionally, the test module 304 is configured to: set at least one test point position in the overall generation process of the deep learning model by using the preset test script; and perform function test on the second processing result based on the at least one test point position, to output the test result.

Optionally, the second processing result includes combinations in the multiple functions to be selected corresponding to each of the multiple processing links. The test module 304 is configured to respectively perform function test on the combinations in the multiple functions to be selected corresponding to each processing link based on the at least one test point position, to output the test result.

Optionally, the test result includes: identification information of the deep learning model; software and hardware configuration information associated with the deep learning model; attribute test information of the deep learning model; and prediction result information of the deep learning model.

In the technical solution of the present disclosure, the involved acquisition, storage, and application of personal information of a user are in compliance with relevant laws and regulations, and does not violate public order and good customs.

According to an embodiment of the present disclosure, the present disclosure further provides an electronic device, a readable storage medium, and a computer program product.

Figure 4:
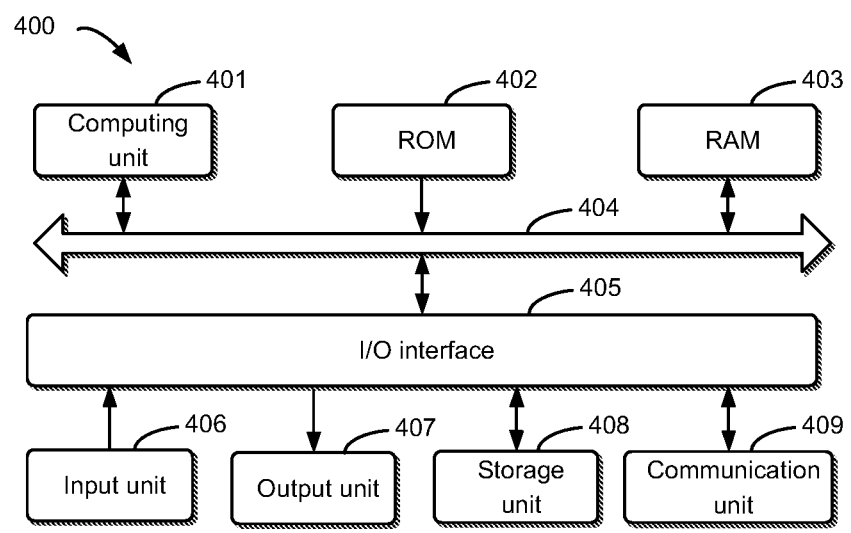
FIG. 4 is a schematic block diagram of an electronic device 400 according to an embodiment of the present disclosure.

FIG. 4 is a schematic block diagram of an example electronic device 400 according to an embodiment of the present disclosure. The electronic device is intended to represent various forms of digital computers, such as laptop computers, desktop computers, workbenches, personal digital assistants, servers, blade servers, mainframe computers, and other suitable computers. The electronic device may also express various forms of mobile devices, such as personal digital processing, cellular phones, smart phones, wearable devices, and other similar computing devices. The components shown herein, connections and relationships of the components, and functions of the components are examples, and are not intended to limit the implementation of the present disclosure described and/or required herein.

As shown in FIG. 4, the device 400 includes a computing unit 401. The computing unit may perform various appropriate actions and processing operations according to a computer program stored in a Read-Only Memory (ROM) 402 or a computer program loaded from a storage unit 408 into a Random Access Memory (RAM) 403. In the RAM 403, various programs and data required for the operation of the device 400 may also be stored. The computing unit 401, the ROM 402, and the RAM 403 are connected with each other by using a bus 404. An Input/Output (I/O) interface 405 is also connected with the bus 404.

Multiple components in the device 400 are connected with the I/O interface 405, and include: an input unit 406, such as a keyboard and a mouse; an output unit 407, such as various types of displays and loudspeakers; the storage unit 408, such as a disk and an optical disc; and a communication unit 409, such as a network card, a modem, and a wireless communication transceiver. The communication unit 409 allows the device 400 to exchange information or data with other devices through a computer network, such as the Internet, and/or various telecommunication networks.

The computing unit 401 may be various general and/or special processing assemblies with processing and computing capabilities. Some examples of the computing unit 401 include, but are not limited to, a Central Processing Unit (CPU), a Graphics Processing Unit (GPU), various dedicated Artificial Intelligence (AI) computing chips, various computing units for running machine learning model algorithms, a Digital Signal Processor (DSP), and any appropriate processors, controllers, microcontrollers, and the like. The computing unit 401 performs the various methods and processing operations described above, for example, the method for generating and applying a deep learning model based on a deep learning framework. For example, in some embodiments, the method for generating and applying a deep learning model based on a deep learning framework may be implemented as a computer software program, which is tangibly contained in a machine-readable medium, such as the storage unit 408. In some embodiments, part or all of the computer program may be loaded and/or installed on the device 400 via the ROM 402 and/or the communication unit 409. When the computer program is loaded into the RAM 403 and performed by the computing unit 401, at least one step of the method for generating and applying a deep learning model based on a deep learning framework described above may be performed. Alternatively, in other embodiments, the computing unit 401 may be configured to perform the method for generating and applying a deep learning model based on a deep learning framework in any other suitable manners (for example, by means of firmware).

The various implementations of systems and technologies described herein may be implemented in a digital electronic circuit system, an integrated circuit system, a Field Programmable Gate Array (FPGA), an Application-Specific Integrated Circuit (ASIC), an Application-Specific Standard Product (ASSP), a System-On-Chip (SOC), a Load Programmable Logic Device (CPLD), computer hardware, firmware, software, and/or a combination thereof. These various implementations may include: being implemented in one or more computer programs, the one or more computer programs may be performed and/or interpreted on a programmable system including at least one programmable processor. The programmable processor may be a dedicated or general programmable processor, which can receive data and instructions from a storage system, at least one input device, and at least one output device, and transmit the data and instructions to the storage system, the at least one input device, and the at least one output device.

Program codes used for implementing the method of the present disclosure can be written in any combination of one or more programming languages. These program codes can be provided to the processors or controllers of general computers, special computers, or other programmable data processing devices, so that, when the program codes are performed by the processors or controllers, functions/operations specified in the flowcharts and/or block diagrams are implemented. The program codes can be performed entirely on a machine, partially performed on the machine, and partially performed on the machine and partially performed on a remote machine as an independent software package, or entirely performed on the remote machine or a server.

In the context of the present disclosure, a machine-readable medium may be a tangible medium, which may include or store a program for being used by at least one instruction execution system, device, or apparatus or in combination with the at least one instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, device, or apparatus, or any foregoing suitable combinations. More specific examples of the machine-readable storage medium may include electrical connections based on one or more wires, a portable computer disk, a hard disk, an RAM, an ROM, an Erasable Programmable Read-Only Memory (EPROM or flash memory), an optical fiber, a portable Compact Disk Read-Only Memory (CD-ROM), an optical storage device, a magnetic storage device, or any above suitable combinations.

In order to provide interaction with a user, the system and technologies described herein can be implemented on a computer, including a display device for displaying information to the user (for example, a Cathode Ray Tube (CRT) or a Liquid Crystal Display (LCD) monitor), a keyboard and a pointing device (for example, a mouse or a trackball). The user can provide an input to the computer by using the keyboard and the pointing device. Other types of devices may also be configured to provide interaction with the user, for example, the feedback provided to the user may be any form of sensory feedback (such as visual feedback, auditory feedback, or tactile feedback), and may be the input from the user received in any form (including acoustic input, voice input, or tactile input).

The system and technologies described herein may be implemented in a computing system (for example, as a data server) including a back-end component, or a computing system (for example, an application server) including a middleware component, or a computing system (for example, a user computer with a graphical user interface or network browser, the user may be in interaction with implementations of the system and technologies described herein by using the graphical user interface or network browser) including a front-end component, or a computing system including any combination of the back-end component, the middleware component, or the front-end component. The components of the system can be connected with each other through any form or digital data communication (for example, a communication network) of the medium. Examples of the communication network include a Local Area Network (LAN), a Wide Area Network (WAN), and the Internet.

The computer system may include a client and a server. The client and the server are generally far away from each other and usually interact by means of the communication network. A relationship between the client and the server is generated by the computer program that is run on the corresponding computer and has a client-server relationship with each other. The server may be a cloud server, and may also be a distributed system server, or a server combined with a block chain.

It is to be understood that, the steps may be reordered, added or deleted by using various forms of programs shown above. For example, the steps described in the present disclosure may be performed parallelly, sequentially, or in a different order, as long as desired results of the technical solutions disclosed in the present disclosure can be achieved, which are not limited herein.

The foregoing specific implementations do not constitute limitations on the protection scope of the present disclosure. Those skilled in the art should understand that, various modifications, combinations, sub-combinations and substitutions can be made according to design requirements and other factors. Any modifications, equivalent replacements, improvements and the like made within the spirit and principle of the present disclosure shall fall within the scope of protection of the present disclosure.

What is claimed is:

1. A method for generating and applying a deep learning model based on a deep learning framework, comprising:
    establishing a basic operating environment on a target device, wherein the basic operating environment is used for providing environment preparation for an overall generation process of a deep learning model;
    generating a basic function of the deep learning model in the basic operating environment according to at least one of a service requirement and a hardware requirement, to obtain a first processing result;
    generating an extended function of the deep learning model in the basic operating environment based on the first processing result, to obtain a second processing result; and
    using a preset test script to perform function test on the second processing result, to output a test result.

2. The method as claimed in claim 1, wherein establishing the basic operating environment on the target device comprises:
    acquiring hardware configuration information of the target device;
    determining software configuration information of the target device based on the hardware configuration information; and
    establishing the basic operating environment according to the hardware configuration information and the software configuration information.

3. The method as claimed in claim 2, wherein determining the software configuration information of the target device based on the hardware configuration information comprises:
    determining operating system information, deep learning framework information, model base information, a pre-training model, and training data and prediction data corresponding to the pre-training model of the target device based on the hardware configuration information.

4. The method as claimed in claim 1, wherein generating the basic function of the deep learning model in the basic operating environment according to at least one of the service requirement and the hardware requirement, to obtain the first processing result comprises:

determining a plurality of processing links contained in an overall generation process of the deep learning model, wherein the plurality of processing links are configured to develop, train, and deduce the deep learning model; and generating a basic function of each of the plurality of processing links in the basic operating environment according to at least one of the service requirement and the hardware requirement, to obtain the first processing result.

5. The method as claimed in claim 4, wherein generating the basic function of each of the plurality of processing links in the basic operating environment according to at least one of the service requirement and the hardware requirement, to obtain the first processing result comprises:

generating a basic function of a first part processing link of the plurality of processing links in the basic operating environment according to the service requirement, to obtain a third processing result;

generating a basic function of a second part processing link of the plurality of processing links in the basic operating environment according to the hardware requirement, to obtain a fourth processing result;

generating a basic function of a third part processing link of the plurality of processing links in the basic operating environment according to the service requirement and the hardware requirement, to obtain a fifth processing result; and generating the basic function of each of the plurality of processing links according to the third processing result, the fourth processing result, and the fifth processing result, to obtain the first processing result.

6. The method as claimed in claim 5, wherein generating the basic function of the first part processing link in the basic operating environment according to the service requirement, to obtain the third processing result comprises:

selecting a model algorithm to be used in the basic operating environment from a model base according to the service requirement;

selecting a model compression mode to be used in the basic operating environment according to the service requirement;

selecting a prediction deployment mode to be used in the basic operating environment according to the service requirement; and determining the model algorithm, the model compression mode, and the prediction deployment mode as the third processing result.

7. The method as claimed in claim 5, wherein generating the basic function of the second part processing link of the plurality of processing links in the basic operating environment according to the hardware requirement, to obtain the fourth processing result comprises:

configuring a first software and hardware environment and a second software and hardware environment to be used in the basic operating environment according to the hardware requirement, wherein the first software and hardware environment is a software and hardware environment to be used by model training, and the second software and hardware environment is a software and hardware environment to be used by model deducing deployment; and determining the first software and hardware environment and the second software and hardware environment as the fourth processing result.

8. The method as claimed in claim 5, wherein generating the basic function of the third part processing link of the plurality of processing links in the basic operating environment according to the service requirement and the hardware requirement, to obtain the fifth processing result comprises:

selecting a model training mode to be used in the basic operating environment according to the service requirement and the hardware requirement; and determining the model training mode as the fifth processing result.

9. The method as claimed in claim 4, wherein the plurality of processing links comprise:

a model algorithm selection link;

a model training software and hardware environment configuration link;

a model training mode selection link;

a model compression mode selection link;

a model training link;

a model saving link;

a model prediction deployment mode selection link; and a model deducing deployment software and hardware environment configuration link.

10. The method as claimed in claim 4, wherein generating the extended function of the deep learning model in the basic operating environment based on the first processing result, to obtain the second processing result comprises:

adding the extended function in addition to the basic function into each of the plurality of processing links based on the first processing result to determine plurality of functions to be selected corresponding to each processing link; and respectively selecting any one function from the plurality of functions to be selected corresponding to each processing link to combine and perform the overall generation process of the deep learning model, to obtain the second processing result.

11. The method as claimed in claim 10, wherein respectively selecting any one function from the plurality of functions to be selected corresponding to each processing link to combine and perform the overall generation process of the deep learning model, to obtain the second processing result comprises:

randomly selecting a to-be-combined model algorithm in the model algorithm selection link;

randomly determining a first to-be-combined software and hardware environment in the model training software and hardware environment configuration link;

randomly selecting a to-be-combined model training mode in the model training mode selection link;

randomly selecting a to-be-combined model compression mode in the model compression mode selection link;

randomly selecting a to-be-combined model prediction deployment mode in the model prediction deployment mode selection link;

randomly determining a second to-be-combined software and hardware environment in the model deducing deployment software and hardware environment configuration link; and combining the to-be-combined model algorithm, the first to-be-combined software and hardware environment, the to-be-combined model training mode, the to-be-combined model compression mode, the to-be-combined model prediction deployment mode, and the second to-be-combined software and hardware environment to perform the overall generation process of model developing, training and deducing to obtain the second processing result, until combinations in the plurality of functions to be selected corresponding to each processing link are completely performed.

12. The method as claimed in claim 4, wherein using the preset test script to perform function test on the second processing result, to output the test result comprises:
   setting at least one test point position in the overall generation process of the deep learning model by using the preset test script; and
   performing function test on the second processing result based on the at least one test point position, to output the test result.

13. The method as claimed in claim 12, wherein the second processing result comprises combinations in the plurality of functions to be selected corresponding to each of the plurality of processing links; and performing function test on the second processing result based on the at least one test point position, to output the test result comprises:
   respectively performing function test on the combinations in the plurality of functions to be selected corresponding to each processing link based on the at least one test point position, to output the test result.

14. The method as claimed in claim 12, wherein the test result comprises:
   identification information of the deep learning model;
   software and hardware configuration information associated with the deep learning model;
   attribute test information of the deep learning model; and
   prediction result information of the deep learning model.

15. The method as claimed in claim 4, wherein the service requirement is used for determining a basic function of a first part processing link of the plurality of processing links, the hardware requirement is used for determining a basic function of a second part processing link of the plurality of processing links, and the service requirement and the hardware requirement are used for determining a basic function of a third part processing link of the plurality of processing links.

16. The method as claimed in claim 15, wherein the basic function of the first part processing link comprises:
   a model algorithm to be used in the basic operating environment;
   a model compression mode to be used in the basic operating environment; and
   a prediction deployment mode to be used in the basic operating environment.

17. The method as claimed in claim 15, wherein the basic function of the second part processing link comprises:
   a software and hardware environment to be used in the basic operating environment.

18. The method as claimed in claim 15, wherein the basic function of the third part processing link comprises:
   a training mode of the model to be used in the basic operating environment.

19. An electronic device, comprising:
   at least one processor, and
   a memory, communicatively connected with the at least one processor, wherein
   the memory is configured to store at least one instruction executable by the at least one processor, and the at least one instruction is performed by the at least one processor, to cause the at least one processor to perform the following steps:
   establishing a basic operating environment on a target device, wherein the basic operating environment is used for providing environment preparation for an overall generation process of a deep learning model;
   generating a basic function of the deep learning model in the basic operating environment according to at least one of a service requirement and a hardware requirement, to obtain a first processing result;
   generating an extended function of the deep learning model in the basic operating environment based on the first processing result, to obtain a second processing result; and
   using a preset test script to perform function test on the second processing result, to output a test result.

20. A non-transitory computer-readable storage medium, storing at least one computer instruction, wherein the at least one computer instruction is used for a computer to perform the following steps:
   establishing a basic operating environment on a target device, wherein the basic operating environment is used for providing environment preparation for an overall generation process of a deep learning model;
   generating a basic function of the deep learning model in the basic operating environment according to at least one of a service requirement and a hardware requirement, to obtain a first processing result;
   generating an extended function of the deep learning model in the basic operating environment based on the first processing result, to obtain a second processing result; and
   using a preset test script to perform function test on the second processing result, to output a test result.

* * * * *